United States Patent
Fingler et al.

(10) Patent No.: US 7,837,397 B2
(45) Date of Patent: Nov. 23, 2010

(54) DIGITAL SIGNAL MEDIA CONVERSION PANEL

(75) Inventors: Laurence Henry Fingler, King City (CA); William Alexander Slater, Tottenham (CA); Hung Van Tran, Milton (CA)

(73) Assignee: Fiber Connections Inc., Schomberg, ON (CA)

( * ) Notice: Subject to any disclaimer, the term of this patent is extended or adjusted under 35 U.S.C. 154(b) by 211 days.

(21) Appl. No.: 12/073,724

(22) Filed: Mar. 10, 2008

(65) Prior Publication Data
US 2009/0226181 A1    Sep. 10, 2009

(30) Foreign Application Priority Data
Feb. 13, 2008    (CA) .................................... 2621016

(51) Int. Cl.
*G02B 6/36*    (2006.01)
(52) U.S. Cl. .............................. 385/89; 385/88; 385/90; 385/91; 385/92
(58) Field of Classification Search ................... 385/88, 385/89, 90, 91, 92
See application file for complete search history.

(56) References Cited

U.S. PATENT DOCUMENTS 6,435,727 B1    8/2002    Fingler et al.
6,974,348 B2 *  12/2005   Bentley ................... 439/540.1
7,206,392 B2    4/2007    Fingler et al.

FOREIGN PATENT DOCUMENTS
WO    WO 2007028361 A2 *    3/2007

\* cited by examiner

*Primary Examiner*—Jennifer Doan (57) ABSTRACT

A digital signal media conversion panel has a series of media converters for converting between electrical signals and fiber optic signals. The conversion panel includes a power feed for the media converters. Preferably the conversion panel includes some Power Over Ethernet receptacles thereby simplifying connection of devices such as Voice Over Internet Protocol telephones and security cameras. In this embodiment, a separate power adapter provides two voltages to the patent panel using the power feed. The use of a separate adaptor with two voltages simplifies the design and avoids heat problems.

9 Claims, 9 Drawing Sheets

DIGITAL SIGNAL MEDIA CONVERSION PANEL

FIELD OF THE INVENTION

The present invention relates to communication devices and in particular to a digital signal media conversion panel for use at a workstation having a series of electrical signal connectors associated with media converters to accommodate the transmission and reception of signals through a fiber optic network.

BACKGROUND OF THE INVENTION

Our prior U.S. Pat. No. 6,435,727 discloses a simplified connection arrangement for fiber optic cable. There are similar single source connection arrangements used for electrically connecting different computer equipment to electrical signal based computer networking systems.

More recently in our U.S. Pat. No. 7,206,392 a particular arrangement is disclosed that allows a fiber optic network system to be installed in a premise with this network system having a front interface and a back interface that provide media conversion. The front interface is connected to traditional computer equipment that use electrical signaling. The front interface converts electrical signals to optical signals that are received by the back interface. The back interface then converts the optical signals to electrical signals. In this way the premise can have a fiber optic network installed to allow for future expansion and enhancement of the communication systems.

There are many different devices for converting electrical communication signals to a fiber optic signal for transmission over fiber optic networks. With these systems a workstation requires a series of separate devices for media converters with many of these devices requiring power input and a host of cabling for connecting of different computer devices. Typically devices provided at a workstation still use the electrical based signaling. RJ45 jacks are common and more recently a number of devices have also made use of Power Over Ethernet (POE) type connections. In particular, telephone devices that use Voice Over Internet Protocol (VOIP) require power. On occasion it is also desirable to have a direct fiber optic connection panel at the workstation.

The cabling and media converters required to connect different workstation devices to a fiber optic networking system becomes complicated quickly and often the cabling becomes cluttered and difficult to appreciate. Furthermore, this complicated cabling arrangement can result in inadvertent disconnection that often requires technical service for what turns out to be a simple disconnection. Furthermore, the number of power outlets required at a workstation significantly increases as each adapter requires separate power.

The present invention provides a consolidated media conversion connection system that addresses a number of these difficulties.

SUMMARY OF THE INVENTION

A multi-port patch panel according to the present invention comprises a housing, a multi-fiber optic cable input arrangement at least partially received in the housing, a plurality of media converters within the housing with each media converter having a fiber optic transceiver attached to fibers of the multi-fiber optic cable input arrangement and a plurality of connectors secured in the housing for releasably connecting equipment to the patch panel using a conventional electrical signal connection. Each of the plurality of connectors are in communication with one of the media converters. The patch panel includes a separate power supply connectable with the housing for providing power to the media converters.

According to an aspect of the invention, each of the plurality of electrical connectors are in communication with one of the media converters by way of a flexible circuit assembly.

According to a preferred aspect of the invention at least one of the connectors is a Power Over Ethernet connector and the power supply is a dual voltage power supply providing a first voltage for the media converters and a second voltage for the Power Over Ethernet connector. Preferably, fiber not used in media conversion are connected to a plurality of fiber optic connectors secured to the housing.

In yet a further aspect of the invention the dual voltage power supply is a single adapter connectable with the housing.

In yet a further aspect of the invention the dual voltage power supply is connected to the housing with a locking electrical connector to eliminate accidental disconnection of the supply.

In yet a further aspect of the invention, in some configurations, the electrical connections for both the power input and Ethernet ports are waterproof type connectors to suit challenging environmental applications.

In yet a further aspect of the invention at least two of the connectors are Power Over Ethernet connectors.

In a further aspect of the invention the patch panel includes four separate media converters.

In yet a further aspect of the invention, in some configurations, the internal components are potted in a thermally conductive silicone or epoxy compound to manage thermal aspects of the product and provide environmental protection from liquid, vapor and other contaminants.

In a different aspect of the invention the patch panel includes at least one fiber optic connector forming a direct connection to the multi-fiber optic cable input arrangement.

In a preferred aspect of the invention the multi-fiber optic cable input arrangement includes one of a tail fiber input connector secured in said housing and a pigtail connection.

In a preferred aspect of the invention, the housing includes a metal base plate with a circuit board mounted on the base plate and interior to the housing. The circuit board is divided into regions and each media converter is in one of the regions.

In yet a further aspect of the invention the housing includes a metal base plate with an outer plastic shell thereabove. The metal base plate supports a circuit board of each media converter and acts as a heat sink.

In yet a further aspect of the invention the outer plastic shell on an interior surface includes guide pins for receiving individual fibers of the multi-fiber optic cable with the guide pins arranged to guide the fibers to the media converters while maintaining an acceptable radius of curvature of any changes in direction of the fibers.

BRIEF DESCRIPTION OF THE DRAWINGS

Preferred embodiments of the invention are showing in the drawings wherein.

DETAILED DESCRIPTION OF THE PREFERRED EMBODIMENTS

Figure 1:
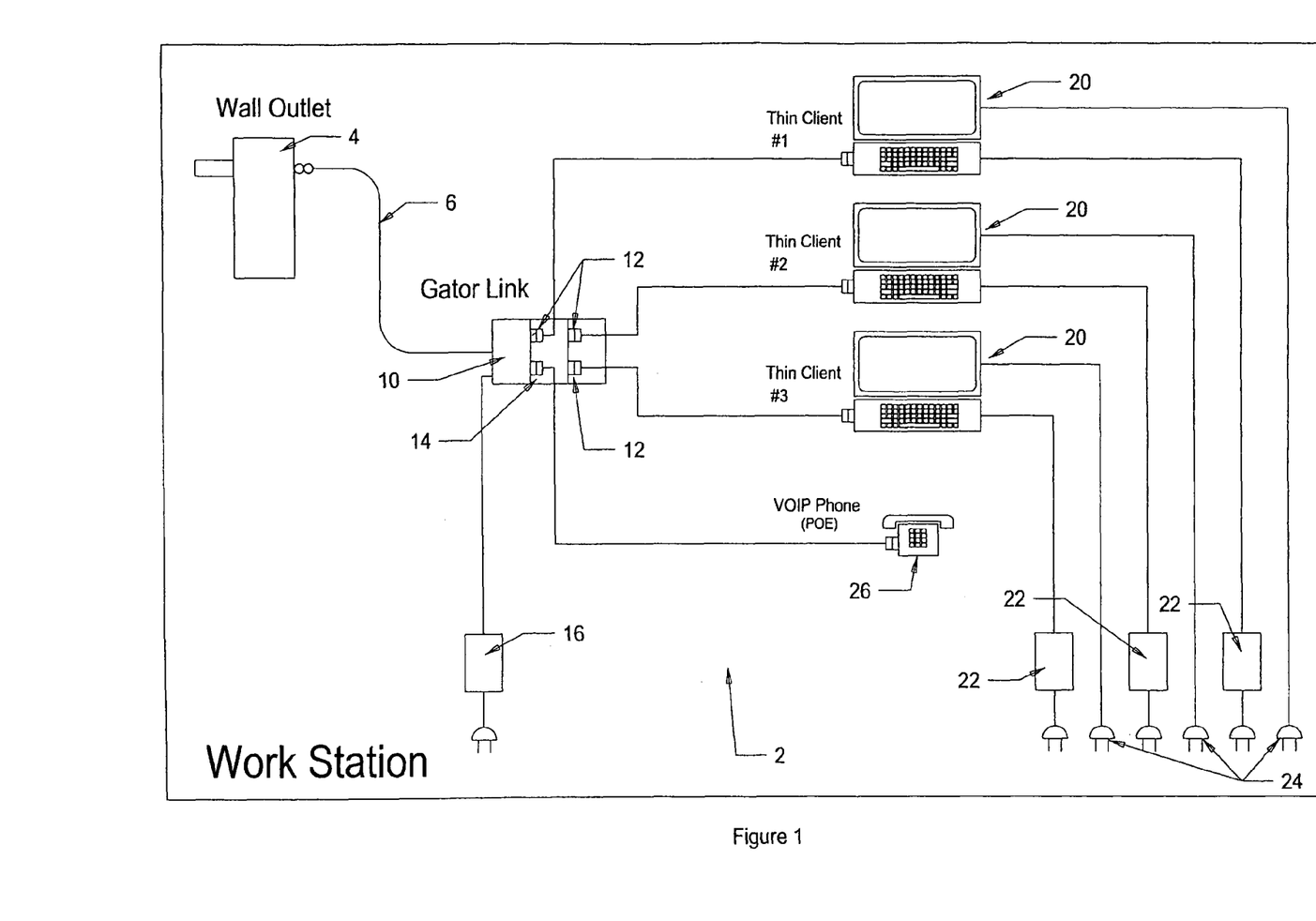
FIG. 1 is a schematic layout of a workstation having a number of different devices connected to a fiber optic network system using the multi-port patch panel.

FIG. 1 is schematic view of a workstation 2 having a number of different devices connected at the workstation. In particular three computers 20 are shown as well as a Voice Over Internet Protocol (VOIP) phone 26. The particular phone 26 is using a Power Over Ethernet (POE) connection to simplify the wiring.

Each of the computers 20 include adapters 22 connected to provide power to the computers and each of the computers include a separate monitor screen having an electrical power plug 24.

The workstation includes a wall outlet 4 that is connected to a fiber optic network. The fiber optic network shown includes twelve optical fibers. A multi-fiber optic cable input 6 connects the wall outlet to the multi-port patch panel 10. The multi-port patch panel 10 includes a number of RJ45 jacks 12 for connecting the patch panel to the communication ports of the computers 20. The RJ45 jack allows for a conventional type connection of the computers 20 to the patch panel with the communication therebetween using electrical signals.

The patch panel 10 also includes at least one Power Over Ethernet connection jack 14.

The multi-port patch panel 10 also includes a dual voltage adaptor 16 providing power to the patch panel. The patch panel preferably has 2 to 4 media converters for allowing conversion between the optical signals sent and received by the patch panel and the electrical signaling received and transmitted from the patch panel to the workstation devices. The Voice Over Internet Protocol phone 26 requires a higher voltage than the media conversion units provided in the patch panel. To simplify the patch panel and also reduce heat problems, the adaptor 16 is designed to provide an appropriate voltage for the Power Over Ethernet connection used by the VOIP phone as well as a reduced voltage necessary for the media conversion that occurs within the patch panel.

Figure 2:
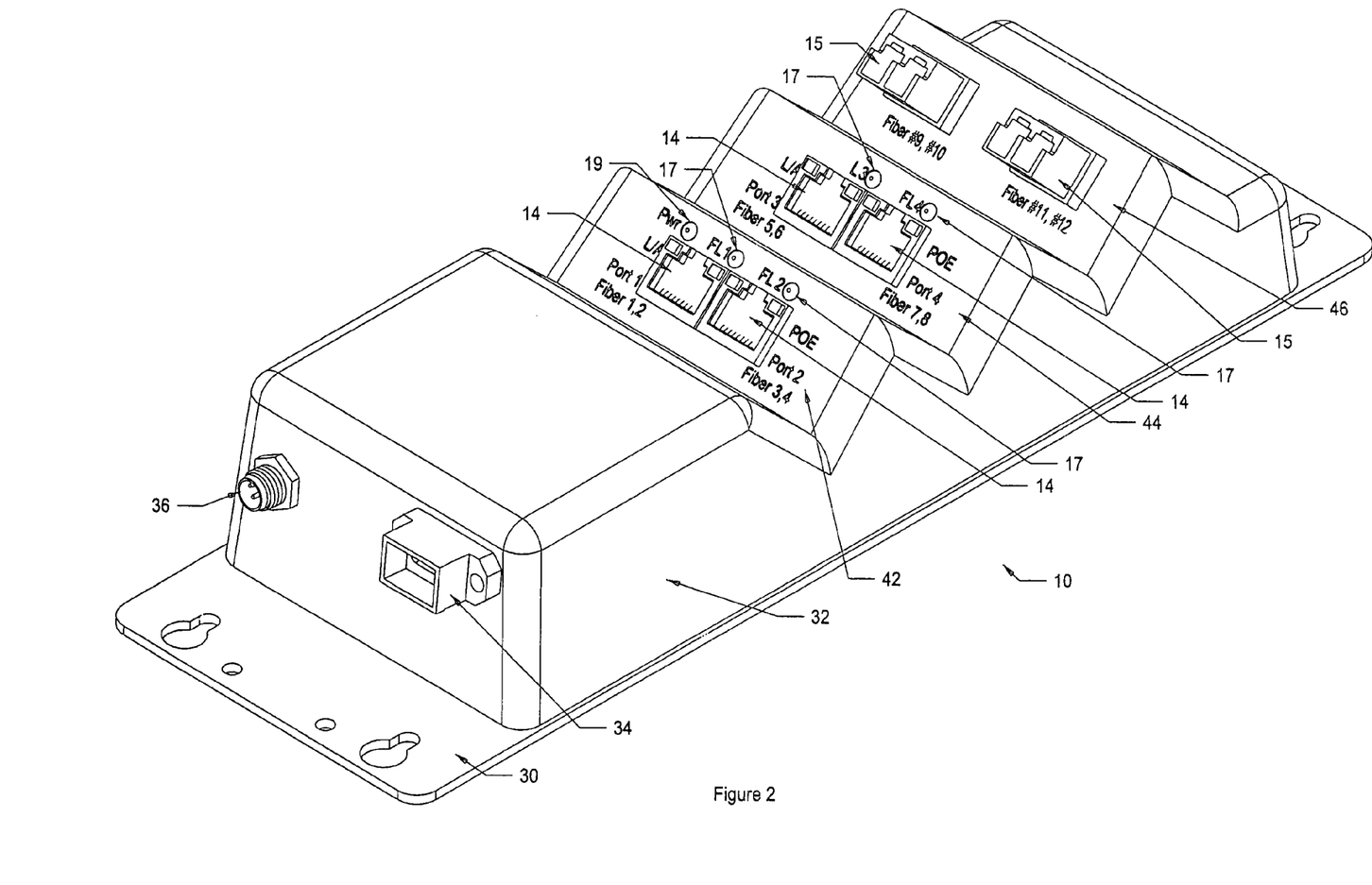
FIG. 2 is a perspective view of the multi-port patch panel.

FIG. 2 shows a slightly different version of the patch panel 10 having 4 Power Over Ethernet connections 14 as well as two fiber optic connectors 15. Each of the terminals 14 and 15 include two separate fiber inputs. Each of the fiber inputs are numbered at the base of each of the receptacles. Preferably each of the electrical signaling receptacles include a LED indicator 17 to indicate when the receptacle is activated or transmitting. A power indicator LED 19 is shown which indicates that power is provided to the patch panel 10.

Depending upon the particular application the patch panel 10 can include non-power Ethernet-type jacks or other suitable electrical signaling jacks for connection to workstation devices. The patch panel can also be used in other applications, i.e. security type applications where the patch panel provides a simple arrangement for connecting of security cameras and other equipment to a fiber optic network system.

It can therefore be appreciated that the number and types of electrical connections for conventional equipment can vary depending upon the particular application. It is also desirable to have at least one Power Over Ethernet-type connection point.

The patch panel 10 includes a metal base plate 30 and a molded plastic shell 32 secured to the base plate. A number of different media converters are provided within the patch panel and are effectively enclosed by the shell 32 and the base plate 30. In the embodiment of FIG. 2 a multi-fiber optic connector 34 is provided for connection to the fiber optic network. The dual voltage adaptor 16 is connected to the patch panel 10 using the voltage connector 36.

Figure 3:
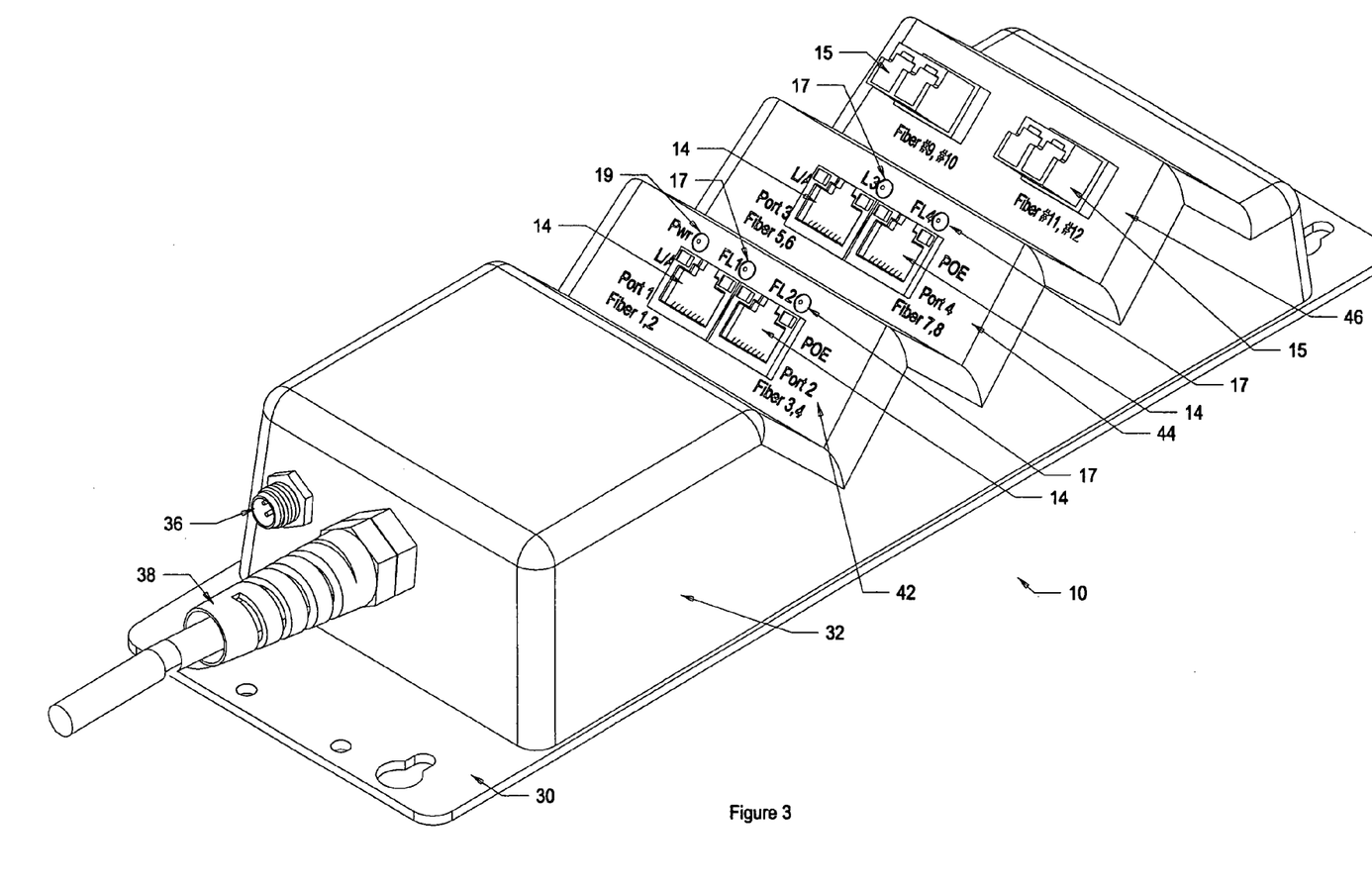
FIG. 3 is a perspective view similar to FIG. 2 using a pigtail input for the fiber optic input of the patch panel.

The patch panel 10 in FIG. 3 is the same as FIG. 2 with the exception that the connector 34 has been removed and a pigtail 38 is used to provide the multi-fiber connection.

Figure 4:
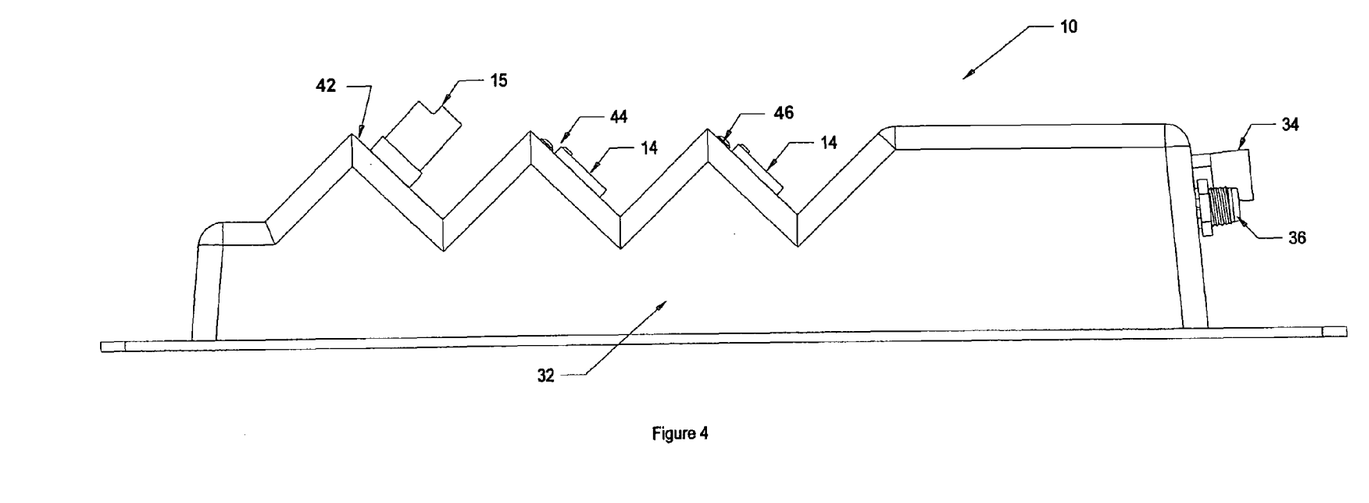
FIG. 4 is a side view of the multi-port patch panel of FIG. 2.

As can be appreciated from FIGS. 2, 3 and the side view of FIG. 4 the patch panel includes angled surfaces 42, 44 and 46 (approximately 45°) that receive the various receptacles. This is similar to the angled surfaces used in our previous design with respect to fiber optic connections. This angled surface relieves stress on connectors and also causes the connecting cables to travel in the same direction and are easier to control and organize. The angled surfaces also reduce the height requirement and with this arrangement the connectors tend to be less prone to damage or inadvertent disconnection.

Figure 5:
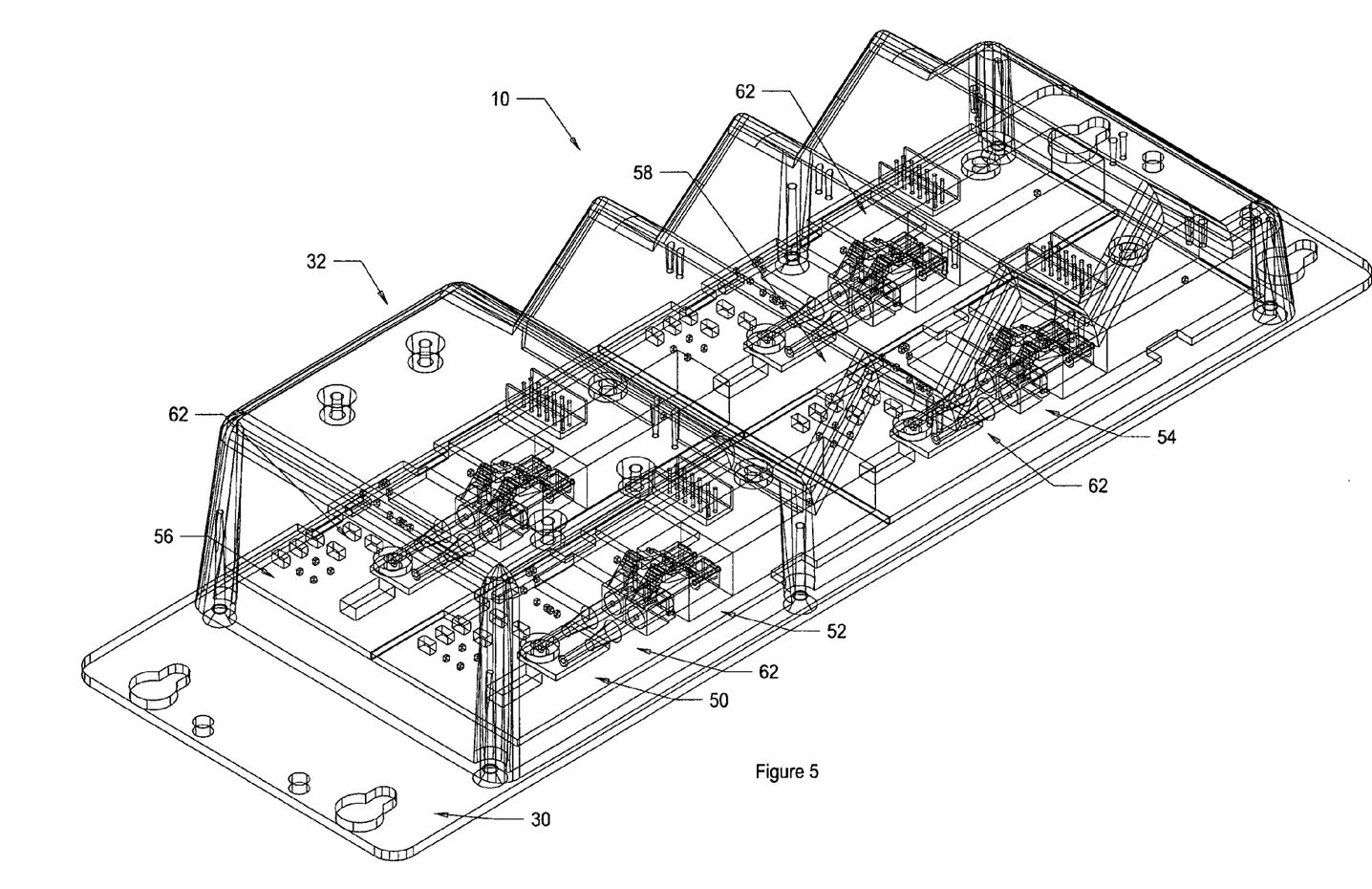
FIG. 5 is a partial perspective view with the shell of the multi-port patch panel shown in an outline to illustrate the components interior to the panel.

The perspective view of FIG. 5 shows the shell 32 in phantom lines to illustrate the various components mounted on the circuit board 50. The circuit board is divided into regions 52, 54, 56 and 58, where each of these regions include a media conversion arrangement 62. Each media conversion arrangement 62 provides the appropriate input/output interface to allow electrical signal communication to devices connected to the patch panel and fiber optics signals between the patch panel and the fiber optic network. Four separate media conversion arrangements 62 have been shown as it is desirable to keep each of the associated output receptacles dedicated or isolated from the other receptacles. The media conversion units 62 do share the common voltage power supply provided by the adaptor 16 (see FIG. 1) and similarly depending upon how many POE receptacles are provided they also share the common voltage. This arrangement of isolating each of the receptacles provides a secure arrangement, necessary for certain applications.

Flexible circuit assemblies provide the connection between the media conversion units and the RJ45 jacks.

Details of the precise operation of the media conversion units is not provided as these media conversion units are known. It is not known to provide a plurality of multimedia converters in a single device nor on a common board divided into independent circuits or as 4 separate boards as shown in the attached drawings. These circuits are also in heat transfer communication with the metal base plate 30. This allows heat to be dissipated and improves reliability.

Figure 9:
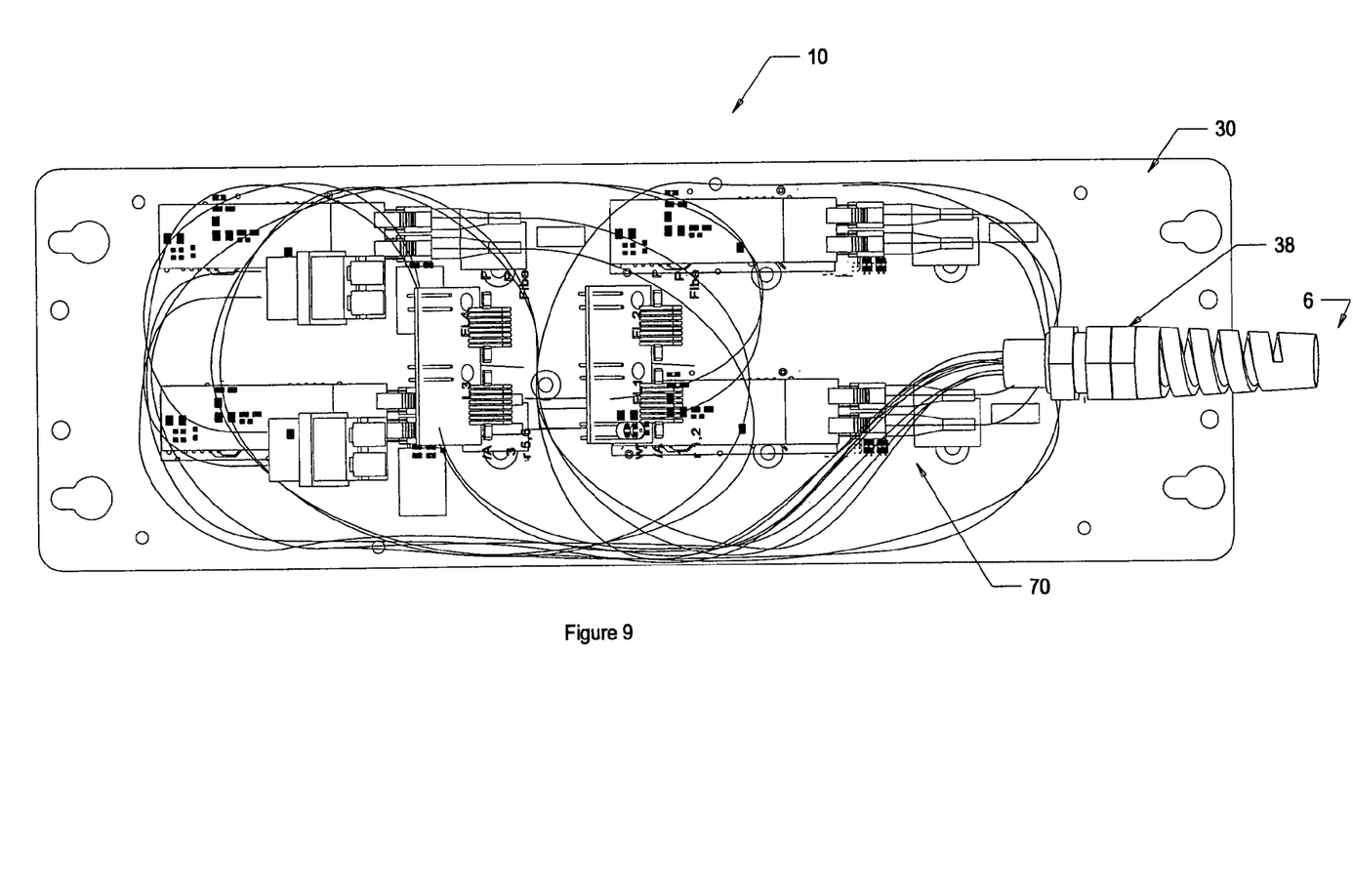
FIG. 9 is a top view showing the guiding of the different fibers of the multi-fiber input cable within the patch panel.

FIG. 9 illustrates the cooperation between the fibers 70 of the multi-fiber optic cable input 6 within in the patch panel. Basically the fibers are controlled within the molded plastic shell 32 to maintain a minimum radius of curvature above a minimum radius of curvature with respect to any changes in direction. This ensures efficient transmission of light through the fibers as signal loss occurs below the minimum. The molded plastic shell 32 includes a number of guide pins on its interior surface for receiving of the fibers and act as holding points to allow the fibers to curve between pins. This is particularly true at the end of the patch panel as some of the fibers are led from one end of the patch panel to the other and down the opposite side to connect with a particular jack. In this way control of the fibers within the device is maintained. The particular routing of the fibers can be appreciated from the top schematic view of FIG. 9. In actual fact the particular curves of the individual fibers can also take advantage of a certain height dimension to maintain a satisfactory degree of curvature.

Figure 6:
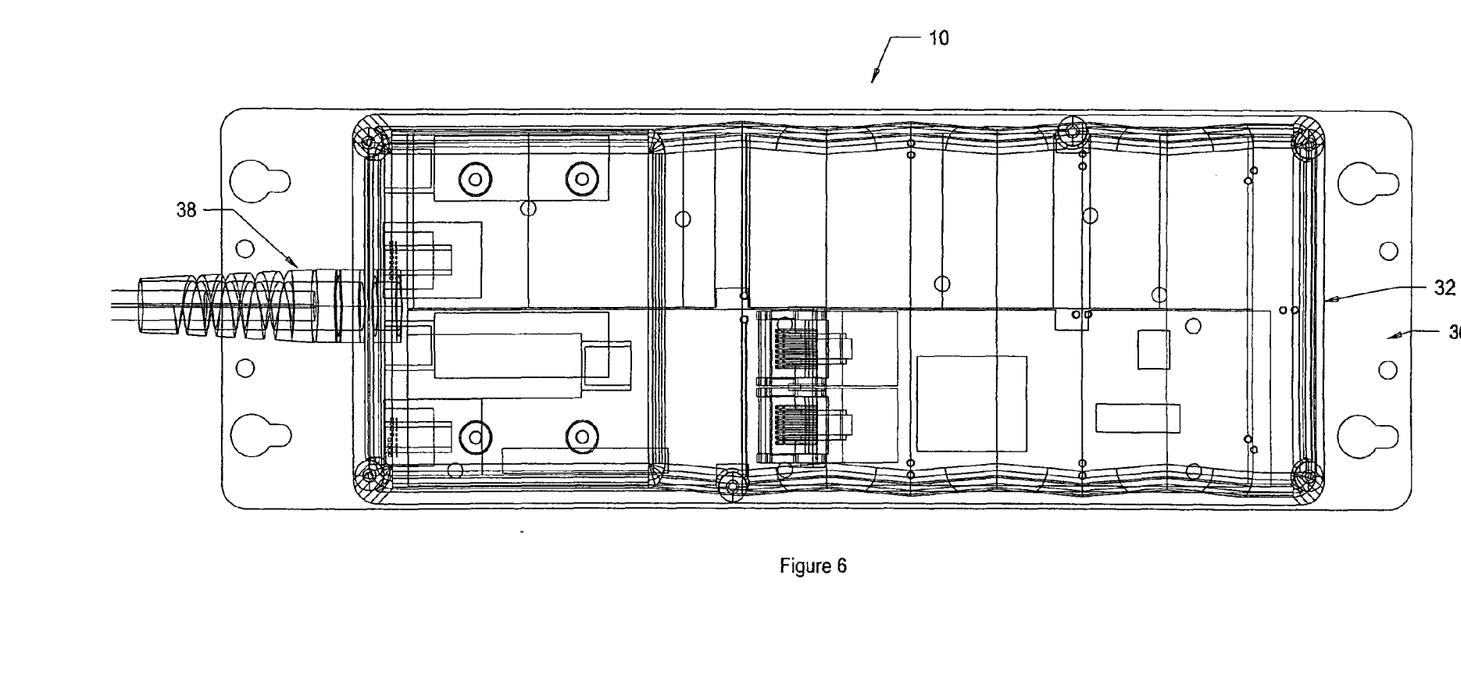
FIG. 6 is a top view showing various components of the patch panel.
Figure 7:
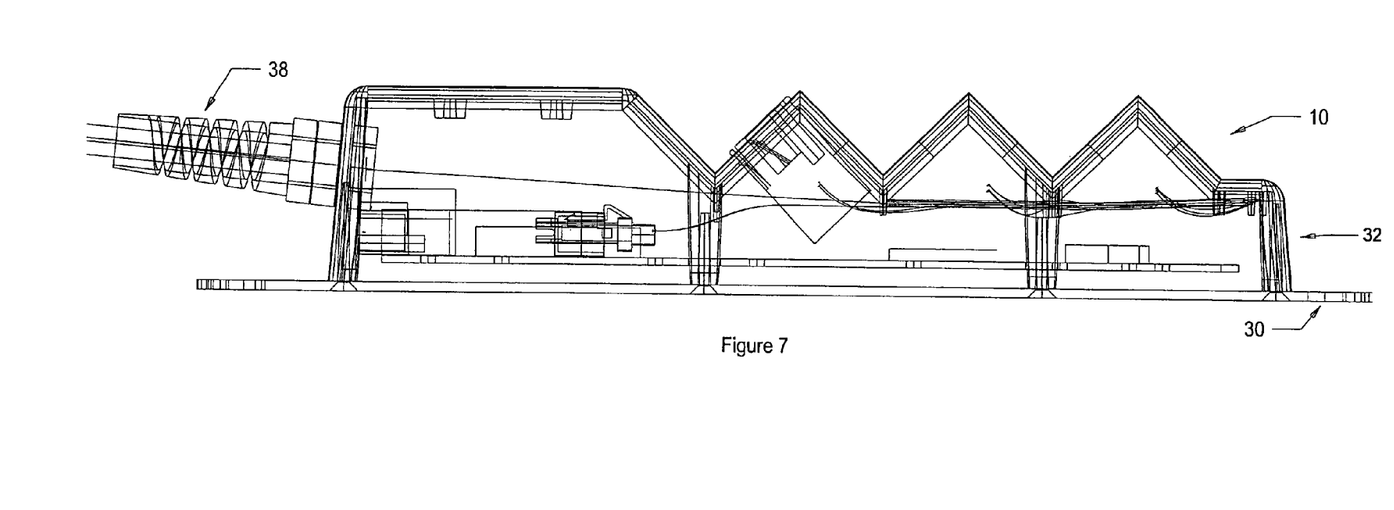
FIG. 7 is a sectional view through the patch panel showing the different components.
Figure 8:
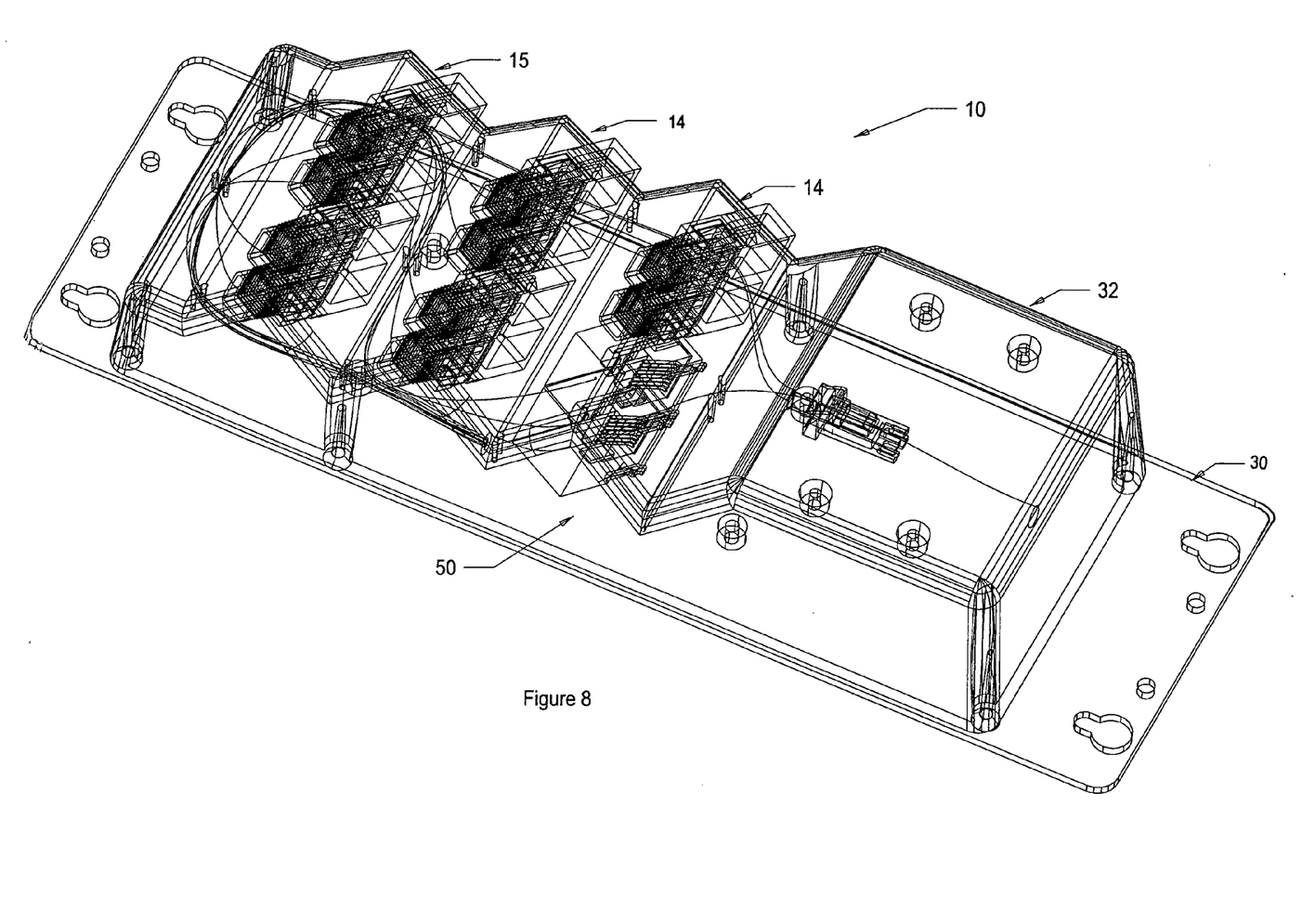
FIG. 8 is a perspective view showing the shell of the patch panel in a transparent type manner and illustrating the components within the patch panel.

With the patch panel as shown in FIGS. 6, 7 and 8 the circuit board 50 is secured above and in close proximity to the metal base plate 30. The circuit board extends the approximate length of patch panel that is enclosed within the molded plastic shell. The space above the circuit board is used for channeling or routing of the fibers to the media converters and/or the ports. With respect to the fiber optic connectors, the individual fibers are merely being routed to the particular ports.

The base plate 30 also includes a series of ports to the exterior of the plastic shell to allow fastening of a patch panel to a wall, office panel or other structure. In addition it is possible to include a magnetic securement of the patch panel to a metal surface.

The particular patch panel as disclosed herein is able to reduce the number of power outlets that are required at a particular workstation due to the provision of Power Over Ethernet ports and providing a patch panel with multiple media converters. This results in fewer power bars at the workstation as well as simplified wiring at the workstation. The consolidation of the media conversions into a single patch panel as used herein greatly simplifies the clutter on the desk and greatly simplifies the cabling. Given that the patch panel can include fiber optic ports it also allows for easy expansion.

In some applications it is desirable to have the various connections to the patch panel 10 utilize locking electrical connections to eliminate accidental disconnection. For example the power input to the patch panel can utilize a lock connection. The electrical connections to both the power input and the Ethernet ports can also be of the waterproof type.

There are also a number of applications where it is desirable to pot the internal components in an epoxy compound or other suitable potting material. This structure provides improved structural durability. A thermally conductive silicone can be used as a potting material to manage thermal aspects of the product and provide environmental protection from liquid, vapor and other contaminants.

Although various preferred embodiments of the present invention have been described herein in detail, it will be appreciated by those skilled in the art, that variations may be made thereto without departing from the scope of the appended claims.

The embodiments of the invention in which an exclusive property of privilege is claimed are defined as follows:

1. A multi-port patch panel comprising a housing; a multi-fiber optic cable input arrangement at least partially received in said housing; a plurality of media converters within said housing with each media converter having a fiber optic transceiver attached to fibers of said multi-fiber optic cable input arrangement; a plurality of connectors secured in said housing for releasably connecting equipment to said patch panel using a conventional electrical signal type connection; each of said plurality of connectors being in communication with one of said media converters; a power supply connectable with said housing for providing power to said media converters; and wherein at least one of said connectors is a Power Over Ethernet (POE) connector and said power supply is a dual voltage power apply providing a first voltage for said media converters and a second voltage for said POE connector.

2. A multi-port patch panel as claimed in claim 1 wherein said dual voltage power supply is a single adapter connectable to said patch panel.

3. A multi-port patch panel as claimed in claim 2 wherein at least two of said connectors are POE connectors.

4. A multi-port patch panel as claimed in claim 1 wherein said patch panel includes 4 separate media converters.

5. A multi-port patch panel as claimed in claim 4 including at least one fiber optic connector forming a direct connection with said multi-fiber optic cable input arrangement.

6. A multi-port patch panel as claimed in claim 1, wherein a multi-fiber optic cable input arrangement includes one of a fiber input connector secured in said housing and pigtail connection.

7. A multi-port patch panel comprising a housing; a multi-fiber optic cable input arrangement at least partially received in said housing; a plurality of media converters within said housing with each media converter having a fiber optic transceiver attached to fibers of said multi-fiber optic cable input arrangement; a plurality of connectors secured in said housing for releasably connecting equipment to said patch panel using a conventional electrical signal type connection; each of said plurality of connectors being in communication with one of said media converters; wherein said housing includes a metal base plate with a circuit board mounted on said base plate and interior to said housing; said circuit board being divided into regions and each media converter is in one of said regions.

8. A multi-port patch panel comprising a housing; a multi-fiber optic cable input arrangement at least partially received in said housing; a plurality of media converters within said housing with each media converter having a fiber optic transceiver attached to fibers of said multi-fiber optic cable input arrangement; a plurality of connectors secured in said housing for releasably connecting equipment to said patch panel using a conventional electrical signal type connection; each of said plurality of connectors being in communication with one of said media converters; wherein said housing includes a metal base plate with an outer plastic shell thereabove; said metal base plate supporting a circuit board of each media converter and acting as a heat sink for said media converters.

9. A multi-port patch panel as claimed in claim 8, wherein said outer plastic shell on an interior surface includes guide pins for receiving individual fibers of said multi-fiber optic cable and guiding said fibers to said media converters while maintaining an acceptable radius of curvature of any changes in direction of said fibers.

* * * * *